(12) United States Patent
Aselage

(10) Patent No.: US 9,039,085 B2
(45) Date of Patent: May 26, 2015

(54) SEAT EXTENSION SEAMLESS GAP FILL

(75) Inventor: Brandon Aselage, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 297 days.

(21) Appl. No.: 13/487,897

(22) Filed: Jun. 4, 2012

(65) Prior Publication Data
US 2013/0320730 A1 Dec. 5, 2013

(51) Int. Cl.
*A47C 7/14* (2006.01)
*B60N 2/02* (2006.01)

(52) U.S. Cl.
CPC .................................. *B60N 2/0284* (2013.01)

(58) Field of Classification Search
USPC .............. 297/337, 284.11, 284.3, 284.2, 312, 297/221, 222
See application file for complete search history.

(56) References Cited

U.S. PATENT DOCUMENTS

| | | | | |
|---|---|---|---|---|
| 774,133 | A * | 11/1904 | De Fontes | 297/222 |
| 857,323 | A * | 6/1907 | Breakenridge | 297/221 |
| 915,025 | A * | 3/1909 | Greer | 297/283.4 |
| 2,536,592 | A * | 1/1951 | Wiederhold et al. | 297/221 |
| 3,108,837 | A * | 10/1963 | Siegal et al. | 297/222 |
| 3,813,151 | A * | 5/1974 | Cadiou | 297/396 |
| 4,333,637 | A * | 6/1982 | Shelton | 5/600 |
| 4,541,669 | A * | 9/1985 | Goldner | 297/284.11 |
| 4,773,703 | A * | 9/1988 | Krugener et al. | 297/284.1 |
| 4,790,592 | A * | 12/1988 | Busso et al. | 297/184.11 |
| 5,171,062 | A | 12/1992 | Courtois | |
| 5,203,606 | A * | 4/1993 | Granzotto | 297/201 |
| 6,030,040 | A * | 2/2000 | Schmid et al. | 297/284.2 |
| 6,088,643 | A * | 7/2000 | Long et al. | 701/49 |
| 6,382,720 | B1 * | 5/2002 | Franklin et al. | 297/228.13 |
| 7,341,309 | B2 * | 3/2008 | Penley et al. | 297/284.11 |
| 7,506,930 | B2 | 3/2009 | Penley et al. | |
| 7,597,398 | B2 | 10/2009 | Lindsay | |
| 7,686,394 | B2 * | 3/2010 | Nishikawa et al. | 297/284.3 |
| 7,753,446 | B2 | 7/2010 | Kubler et al. | |
| 8,438,671 | B2 * | 5/2013 | Last | 4/500 |
| 2005/0258678 | A1 * | 11/2005 | Wilkerson et al. | 297/337 |
| 2009/0195041 | A1 * | 8/2009 | Ito et al. | 297/337 |
| 2009/0200848 | A1 | 8/2009 | Kubler et al. | |
| 2011/0163583 | A1 * | 7/2011 | Zhong et al. | 297/337 |

FOREIGN PATENT DOCUMENTS

| | | |
|---|---|---|
| EP | 1800937 A2 | 6/2007 |
| FR | 2940935 A1 | 7/2010 |
| WO | 2005051705 A1 | 6/2005 |
| WO | 2010057335 A1 | 5/2010 |

\* cited by examiner

*Primary Examiner* — David E Allred
(74) *Attorney, Agent, or Firm* — Vichit Chea; Price Heneveld LLP

(57) ABSTRACT

A vehicle seating assembly includes a seatpan coupled with a track assembly that has a rail and a slide. The vehicle seating assembly also includes a cushion assembly that has a movable cushion and a base cushion with a slot. The movable cushion is slidable between a forward position and a rearward position on the seatpan. In addition, the vehicle seating assembly includes a coverstock with a first portion that is disposed over a movable cushion. The coverstock also has a second portion that is disposed between the seatpan and the cushion assembly. The second portion of the coverstock is withdrawn through the slot when the movable cushion moves to the forward position. A gap is defined by the area between the base cushion and the movable cushion in the forward position. The gap is concealed by the coverstock when the movable cushion is in the forward position.

20 Claims, 6 Drawing Sheets

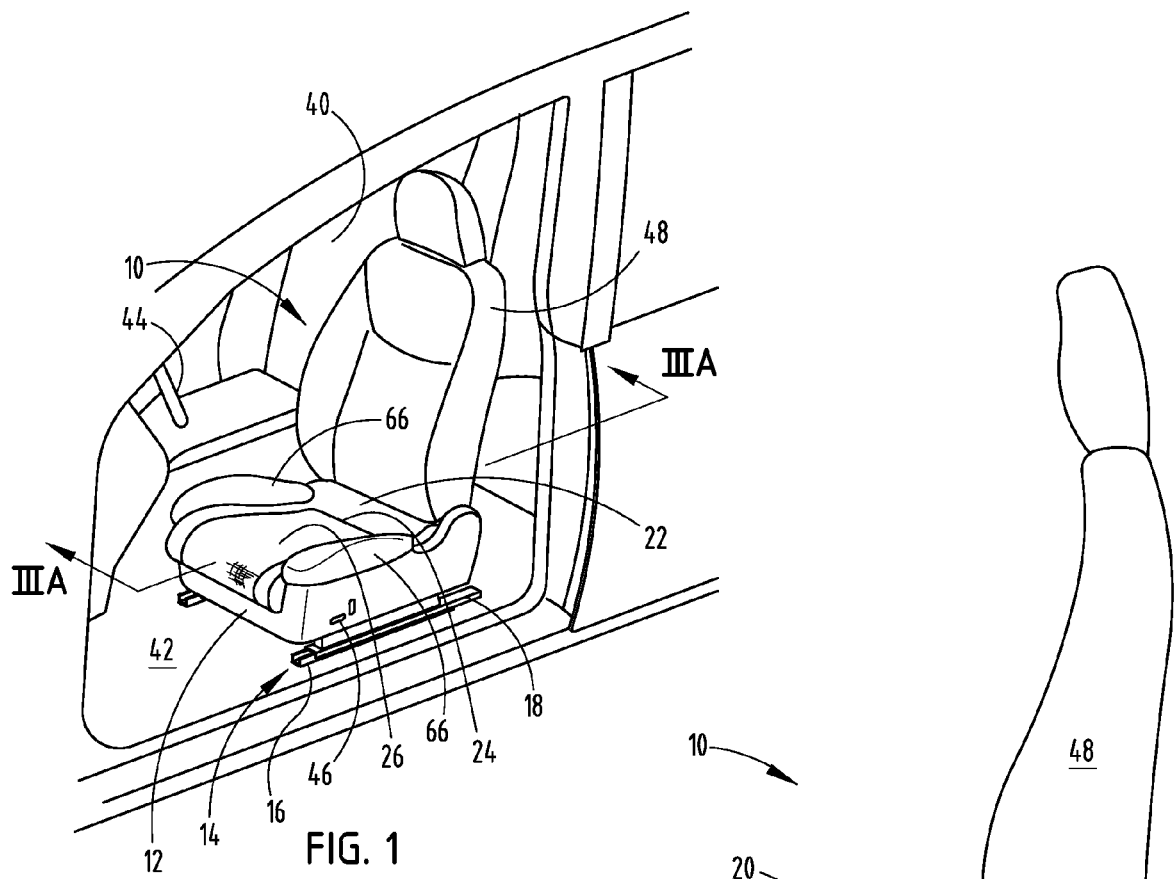
FIG. 1
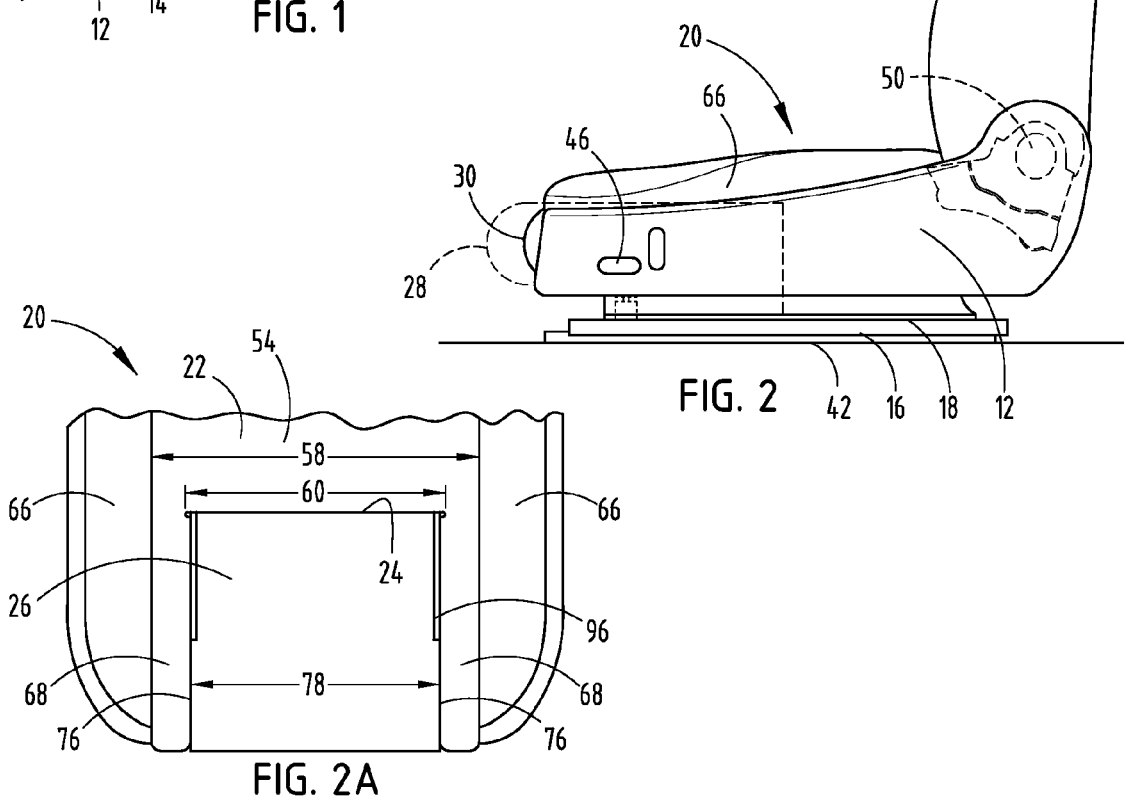
FIG. 2
FIG. 2A

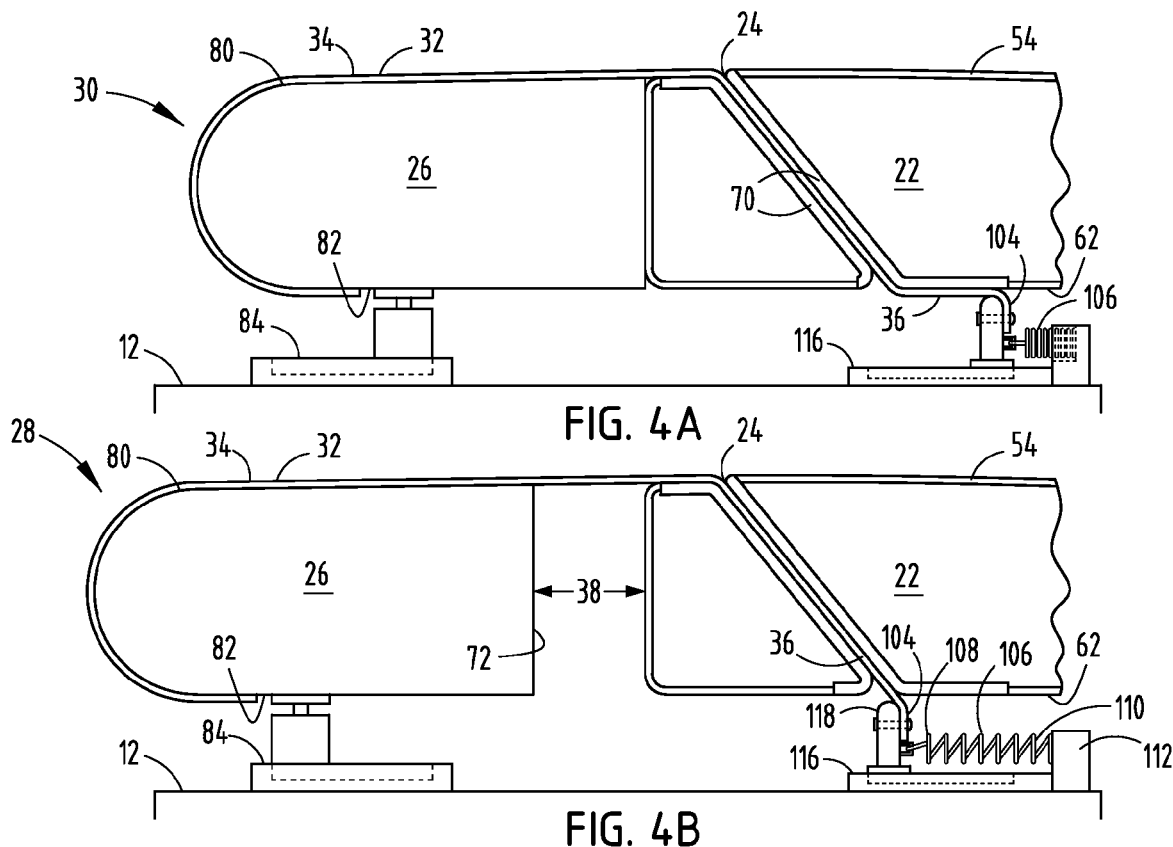
FIG. 4A
FIG. 4B
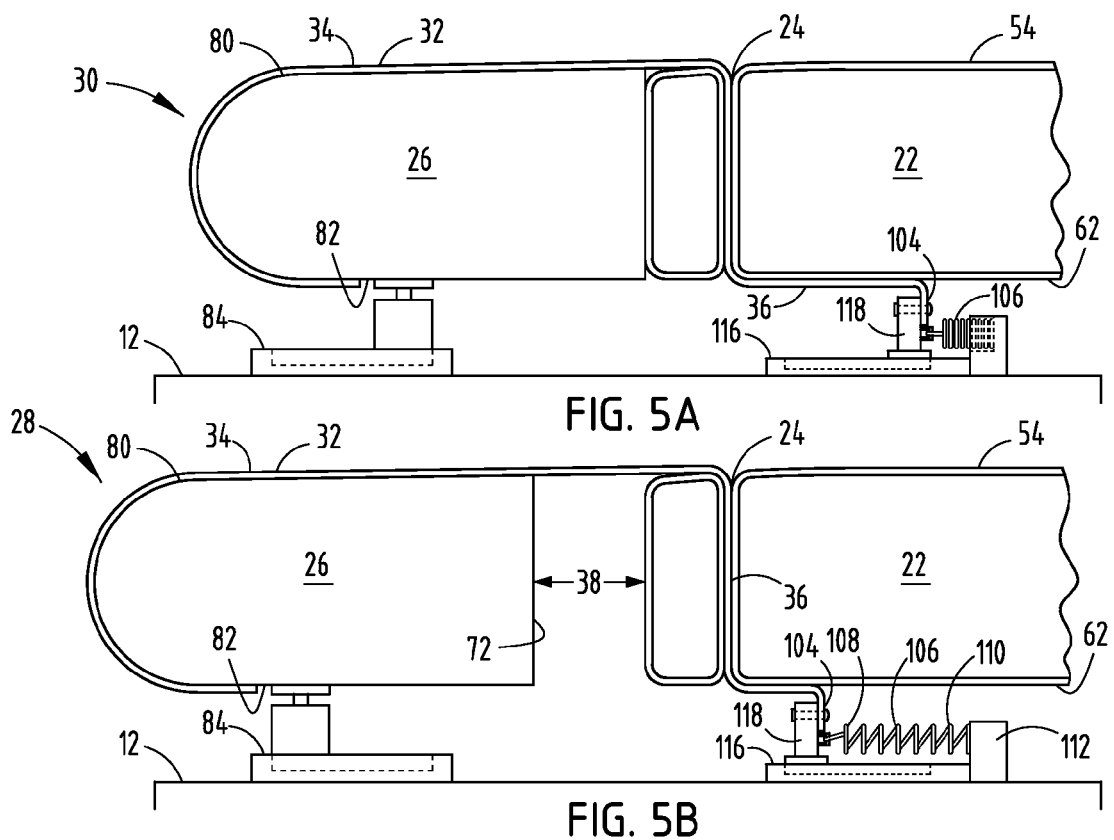
FIG. 5A
FIG. 5B

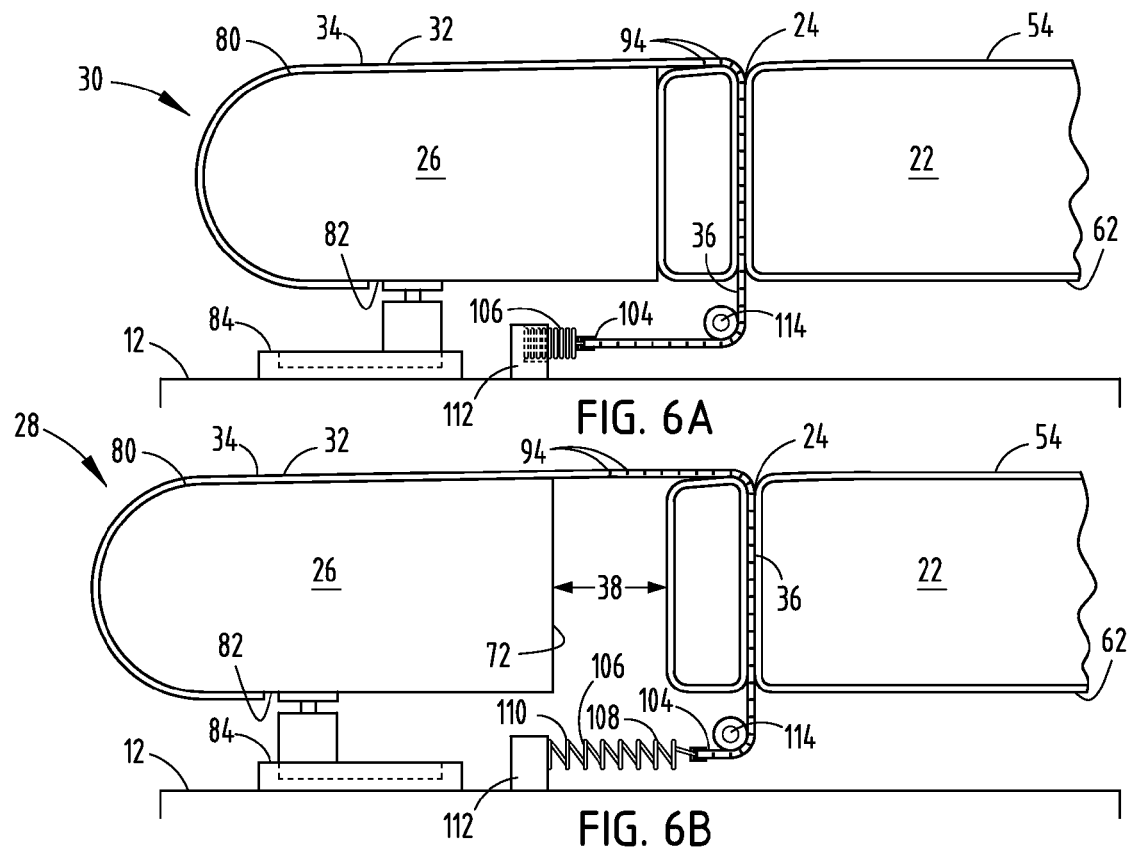
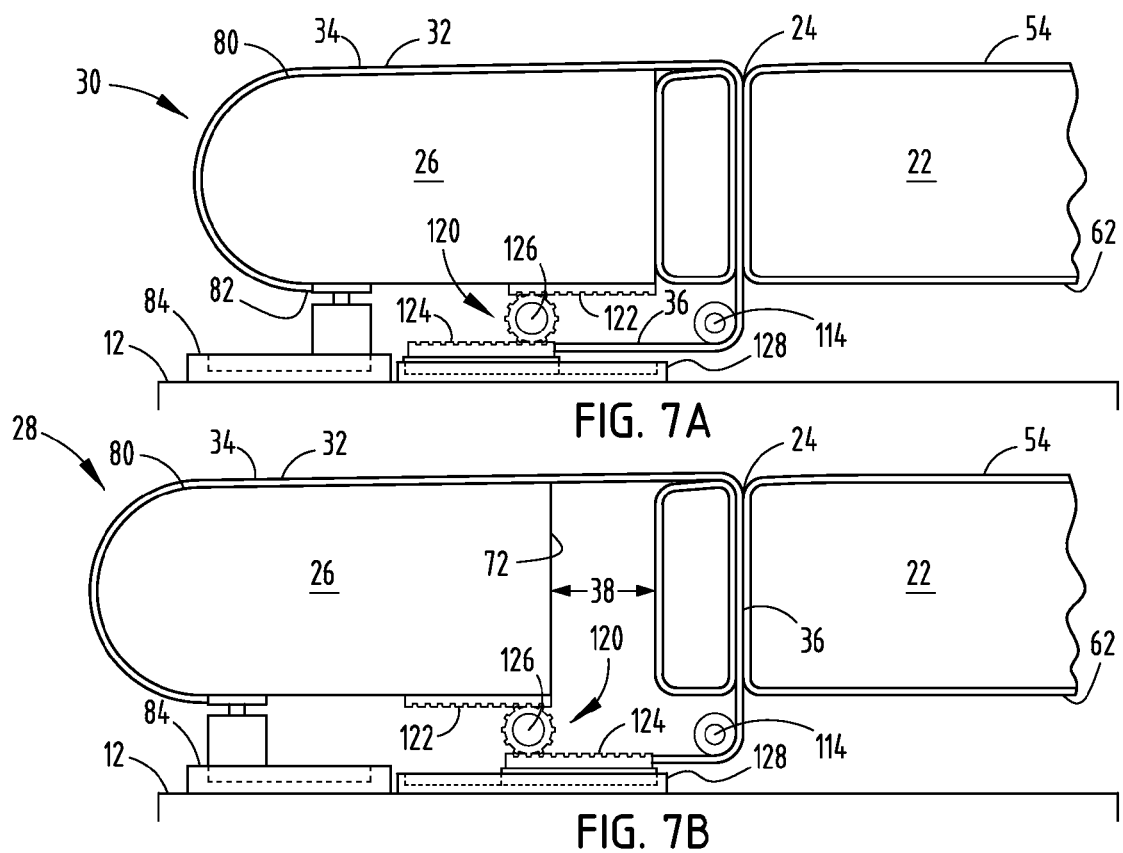

SEAT EXTENSION SEAMLESS GAP FILL

FIELD OF THE INVENTION

The present invention generally relates to vehicle seating assemblies that have a movable portion extendable forward from a seat, and more specifically, to vehicle seating assemblies that have a movable portion that creates a gap between the movable portion and the remaining portion of the seat, when the movable portion is extended forward.

BACKGROUND OF THE INVENTION

Vehicle seating assemblies are configured to support a variety of individuals of all shapes and sizes. Seat features that provide for increased comfort and flexibility are beneficial.

SUMMARY OF THE INVENTION

According to one aspect of the present invention, a vehicle seating assembly includes a seatpan that is coupled to a track assembly. The track assembly has a rail and a slide. The vehicle seating assembly also includes a cushion assembly that has a base cushion with a slot, and a movable cushion. The movable cushion is slidable between a forward position and a rearward position on the seatpan. In addition, the vehicle seating assembly includes a coverstock with a first portion that is disposed over the movable cushion. The coverstock also has a second portion that is disposed between the seatpan and the cushion assembly. The second portion of the coverstock is withdrawn through the slot when the movable cushion moves to the forward position. A gap is defined by the area between the base cushion and the movable cushion in the forward position. The gap is concealed by the coverstock when the movable cushion is in the forward position.

According to another aspect of the present invention, a vehicle seating assembly includes a cushion assembly that has a movable cushion and a base cushion with a slot. The movable cushion is slidable on a seatpan between a forward position and a rearward position. The vehicle seating assembly also includes a coverstock that has a first portion that is disposed over the movable cushion. The coverstock also has a second portion that is disposed between the seatpan and the cushion assembly. The second portion of the coverstock is withdrawn through the slot when the movable cushion moves to the forward position.

According to yet another aspect of the present invention, a vehicle seating assembly includes a seat base that has a slot and a front portion. The seat base is coupled with a track assembly that has a rail and a slide. The vehicle seating assembly also includes a seat extension that is slideable between a forward position and a rearward position. A gap is defined by the area between the front portion of the seat base and the seat extension in the forward position. In addition, the vehicle seating assembly includes a coverstock that has a first portion disposed over the seat extension and a second portion disposed within the slot in the seat base. The second portion of the coverstock is withdrawn through the slot when the seat extension moves to the forward position, thereby concealing the gap with the coverstock. The vehicle seating assembly also includes a retention mechanism that is coupled with the coverstock. The retention mechanism draws the second portion of the coverstock through the slot when the seat extension moves to the rearward position.

According to another aspect of the present invention, a vehicle seating assembly has a gap between a base cushion and a movable cushion in a forward position. A coverstock is disposed on the movable cushion, over the gap, and through a slot in the base cushion, thereby concealing the gap. The coverstock is held in tension over the gap to minimize collection of crumbs, dirt, and other debris while maintaining an aesthetically pleasing appearance. The coverstock draws into the slot when the movable cushion moves to a rearward position, ultimately abutting the base cushion. Concealing the gap area and preventing debris from collecting in the gap provides significant advantages to a vehicle seating assembly.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 1 is a side perspective view of one embodiment of a vehicle seating assembly of the present invention;

FIG. 2 is a side elevational view of a vehicle seating assembly of the present invention;

FIG. 2A is a top plan view of a vehicle seating assembly of the present invention;

FIG. 4A is a side elevational cross-sectional view of a vehicle seating assembly with one embodiment of a retention mechanism with the movable cushion in a rearward position;

FIG. 4B is a side elevational cross-sectional view of the vehicle seating assembly of FIG. 4A with the movable cushion in a forward position;

FIG. 5A is a side elevational cross-sectional view of another vehicle seating assembly having another embodiment of a retention mechanism and the movable cushion in a rearward position;

FIG. 5B is a side elevational cross-sectional view of the vehicle seating assembly of FIG. 5A with the movable cushion in a forward position;

FIG. 6A is a side elevational cross-sectional view of another vehicle seating assembly having another embodiment of a retention mechanism and the movable cushion in a rearward position;

FIG. 6B is a side elevational cross-sectional view of the vehicle seating assembly of FIG. 6A with the movable cushion in a forward position;

FIG. 7A is a side elevational cross-sectional view of another vehicle seating assembly having another embodiment of a retention mechanism and the movable cushion in a rearward position;

FIG. 7B is a side elevational cross-sectional view of the vehicle seating assembly of FIG. 7A with the movable cushion in a forward position;

DETAILED DESCRIPTION OF THE EMBODIMENTS

Figure 3A:
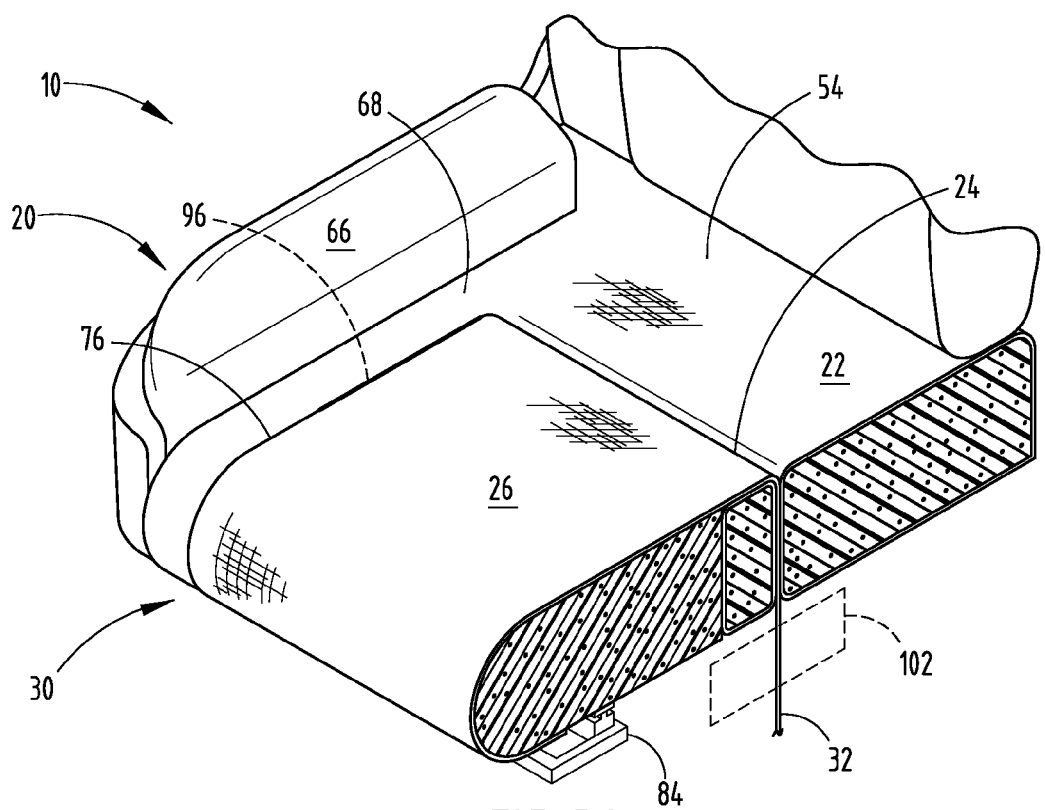
FIG. 3A is a side perspective cross-sectional view of the vehicle seating assembly of the FIG. 1 taken at IIIA with a movable cushion in a rearward position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-4B, reference number 10 generally designates a vehicle seating assembly that includes a seatpan 12 coupled with a track assembly 14. The track assembly 14 has a rail 16 and a slide 18. The vehicle seating assembly 10 also includes a cushion assembly 20 that has a base cushion 22 with a slot 24, and a movable cushion 26. The movable cushion 26 is slidable between a forward position 28 and a rearward position 30 on the seatpan 12. In addition, the vehicle seating assembly 10 includes a coverstock 32 with a first portion 34 that is disposed over the movable cushion 26. The coverstock 32 also has a second portion 36 that is disposed between the seatpan 12 and the cushion assembly 20. The second portion 36 of the coverstock 32 is withdrawn through the slot 24 when the movable cushion 26 moves to the forward position 28. A gap 38 is defined by the area between the base cushion 22 and the movable cushion 26 in the forward position 28. The gap 38 is concealed by the coverstock 32 when the movable cushion 26 is in the forward position 28.

As shown in FIG. 1, the vehicle seating assembly 10 is positioned in the front, driver side seat location within an interior of a vehicle 40. It is also contemplated that the vehicle seating assembly 10 could be positioned at various seat locations within the interior of the vehicle 40, including a front passenger side location, a second row seat location, and a rear seat location. The rail 16 of the track assembly 14 is coupled with a floor 42 of the vehicle 40 and the rail 16 is in substantial alignment with the general direction of travel of the vehicle 40, thereby similarly aligning the vehicle seating assembly 10. The slide 18 of the track assembly 14 slidably engages the rail 16, allowing the vehicle seating assembly 10 to slidably adjust the horizontal position of the vehicle seating assembly 10 along the floor 42 of the vehicle 40. In doing so, the vehicle seating assembly 10 may be slidably adjusted relatively closer to or further from a steering wheel 44 of the vehicle 40.

Referring now to FIG. 2, the slide 18 of the track assembly 14 (FIG. 1) is coupled with the seatpan 12 (FIG. 1), permitting the seatpan 12 to travel along the rail 16 of the track assembly 14 relative to the floor 42. The seatpan 12 includes an electronically responsive controller 46 to operate the horizontal, vertical, and tilt translation of the seatpan 12 relative to the floor 42. It is contemplated that the seatpan 12 may also travel along the rail 16 of the track assembly 14 with manual controls, such as a lever, that may releasably attach a latch assembly at incremental points along the rail 16 of the track assembly 14. In addition, the seatpan 12 is coupled with a seatback 48 and a recliner mechanism 50 for adjusting the orientation of the seatback 48 relative to the seatpan 12.

As illustrated in FIG. 2A, the cushion assembly 20 of the vehicle seating assembly 10 (FIG. 2) includes the base cushion 22 and the movable cushion 26. The base cushion 22 is secured in a generally fixed position relative to the seatpan 12 (FIG. 1). The base cushion 22 has a width 58 generally greater than a width 60 of the slot 24 to provide support at opposing ends of a forward slot portion 56 (FIG. 3C). Further, the movable cushion 26 has vertically extending sidewalls 74 (FIG. 3C) on opposing lateral edges 76 of the movable cushion 26, defining a width 78 of the movable cushion 26 therebetween. The sidewalls 74 of the movable cushion 26 slidably abut outside edges 68 of the base cushion 22. The width 78 of the movable cushion 26 is generally equivalent to or less than the width 60 of the slot 24 in the base cushion 22.

Figure 3B:
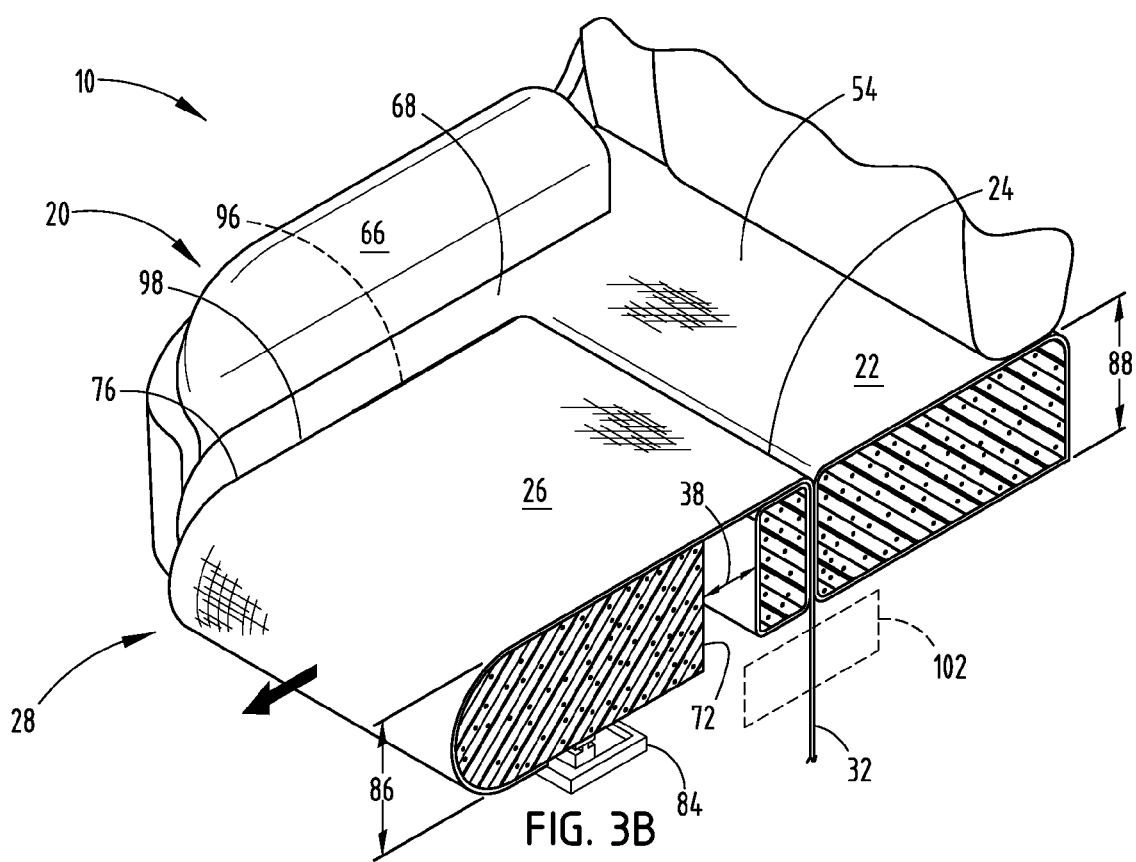
FIG. 3B is a side perspective cross-sectional view of the vehicle seating assembly of the FIG. 1 taken at IIIA with a movable cushion in a forward position.
Figure 3C:
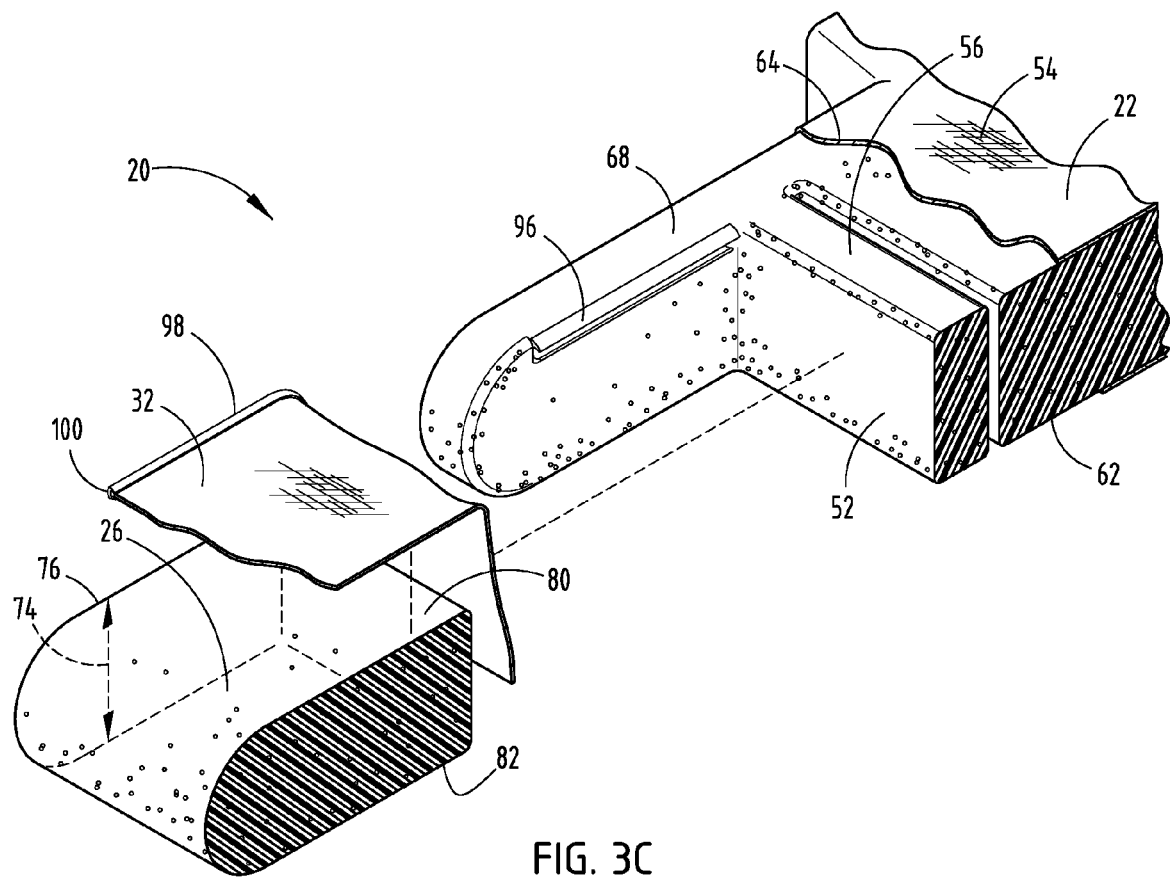
FIG. 3C is an exploded side perspective cross-sectional view of the vehicle seating assembly of FIG. 1 taken at IIIA with cutaway portions of a seat cover and a coverstock.

Referring now to the embodiment generally illustrated in FIGS. 3A and 3B, the movable cushion 26 of the cushion assembly 20 is slidable between the forward position 28 (FIG. 3B) and the rearward position 30 (FIG. 3A) on the seatpan 12 (FIG. 2). In the rearward position 30, a back end 72 of the movable cushion 26 generally abuts the forward slot portion 56 (FIG. 3C) of the base cushion 22. In the forward position 28, the movable cushion 26 is generally situated forward and away from the forward slot portion 56 of the base cushion 22, forming the gap 38 between the back end 72 of the movable cushion 26 and the forward slot portion 56 of the base cushion 22.

As further illustrated in FIGS. 3A and 3B, the coverstock 32 is coupled to a retention mechanism 102, which draws the second portion 36 (FIGS. 4A-4B) of the coverstock 32 through the slot 24 when the movable cushion 26 moves to the rearward position 30. Likewise, the retention mechanism 102 feeds the second portion 36 of the coverstock 32 through the slot 24 when the movable cushion 26 moves to the forward position 28. A distal end 104 (FIGS. 5A-9B) of the coverstock 32 is coupled to the retention mechanism 102, as shown in the illustrated embodiments. The retention mechanism 102 maintains a tension on the second portion 36 of the coverstock 32, allowing the coverstock 32 to form a generally planar surface that conceals the gap 38 and has a substantially planar alignment with a sitting surface 54 of the base cushion 22 and a top surface 80 (FIGS. 4A-4B) of the movable cushion 26. The retention mechanism 102 may be constructed in several embodiments, as illustrated and described in detail below.

As illustrated in FIG. 3C, the sitting surface 54 of the base cushion 22 and a support surface 62 of the base cushion 22 are located on opposing sides of the base cushion 22. The support surface 62 generally abuts the seatpan 12 (FIG. 1) and is coupled therewith. The sitting surface 54 is typically formed and adapted for a sitting area of a user, specifically the pelvis and rear femur of a user. A seat cover 64 made of an upholstery, such as, leather, vinyl, fabric, or other textile, is generally disposed over the sitting surface 54 of the base cushion 22, leaving the slot 24 exposed. Side cushions 66 (FIG. 3B) extend upwardly on the outside edges 68 of the base cushion 22 to provide additional lateral sitting support to the user. As shown here and in the embodiments illustrated in FIGS. 5A-9B, the slot 24 is formed in alignment with a front 52 of the base cushion 22, wherein the slot 24 extends down from and substantially perpendicular to the sitting surface 54. The forward slot portion 56 of the base cushion 22 is defined between the slot 24 and the front 52 of the base cushion 22.

Referring again to FIG. 3C, the top surface 80 and a bottom surface 82 of the movable cushion 26 are located on opposing sides of the movable cushion 26. The top surface 80 is in substantially planar alignment with the sitting surface 54 of the base cushion 22, and the top surface 80 is typically adapted for the forward leg area of a user, behind the knee and below the femur. The bottom surface 82 of the movable cushion 26 is in substantially planar alignment with the support surface 62 of the base cushion 22. A carriage assembly 84 (FIG. 3B) is adapted to the bottom surface 82 of the movable cushion 26 to facilitate the sliding movement of the movable cushion 26 between the forward and rearward positions 28, 30.

Figure 3D:
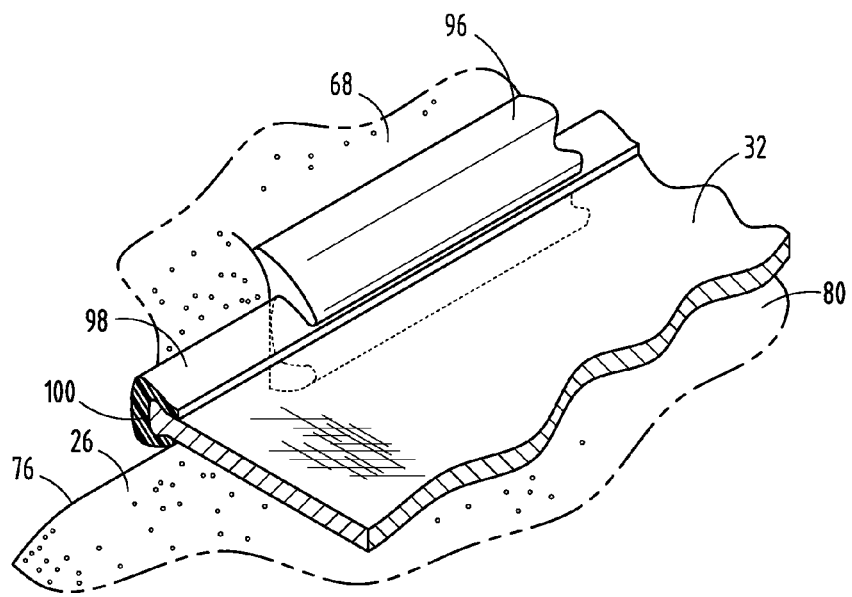
FIG. 3D is an enlarged partial side perspective view of a channel and bulbous edge of the vehicle seating assembly of FIG. 3C.

As illustrated in FIG. 3D, a channel 96 is disposed on the outside edge 68 of the base cushion 22 to receive a bulbous portion 98 of an edge 100 of the coverstock 32. The channel 96 is positioned to extend along the outside edge 68 of the base cushion 22 that is exposed to the gap 38 (FIG. 3B) when the movable cushion 26 is in the forward position 28, thereby providing support to the edges 100 of the coverstock 32, concealing the gap 38. The bulbous portion 98 of the edge 100 of the coverstock 32 is slidably engaged by the channel 96, laterally retaining the coverstock 32. The bulbous portion 98 may be formed by extruding polymer or elastomeric material, or stitching along the edge 100 of the coverstock 32.

Referring now to the embodiment depicted in FIGS. 4A and 4B, the gap 38 is further defined by the area between the base cushion 22 and the movable cushion 26, when the movable cushion 26 is in or transitioning to the forward position 28. The gap 38 is enlarged when the movable cushion 26 moves from the rearward position 30 (FIG. 4A) to the forward position 28 (FIG. 4B) and diminished when the movable cushion 26 moves from the forward position 28 to the rearward position 30. Therefore, the gap 38 may be completely diminished when the movable cushion 26 is in the rearward position 30 and the back end 72 of the movable cushion 26 is in abutting contact with the base cushion 22. When the movable cushion 26 moves to the forward position 28, which is generally between 1-5 inches (2.5-12.7 centimeters) away from the base cushion 22, the gap 38 is enlarged. The depth of the gap 38 is generally equivalent to a thickness 86 (FIG. 3B) of the movable cushion 26 or a thickness 88 (FIG. 3B) of the base cushion 22, which is defined, respectively, between the top and bottom surfaces 80, 82 or the sitting surface 54 and the support surface 62.

As further shown in FIGS. 4A and 4B, the first portion 34 of the coverstock 32 is disposed over the movable cushion 26 and the second portion 36 is disposed between the seatpan 12 and the cushion assembly 20. The second portion 36 is withdrawn through the slot 24 when the movable cushion 26 moves to the forward position 28 (FIG. 4B). The coverstock 32 is generally comprised of the same or similar upholstery to that covering other portions of the vehicle seating assembly 10, such as, leather, vinyl, fabric, or other textile. The first and second portions 34, 36 of the coverstock 32 are integral pieces of upholstery, however, multiple pieces of upholstery may be combined to form different portions of the coverstock 32.

Referring again to FIGS. 4A and 4B, the slot 24 is formed at an angle, sloping down toward a rear portion of the vehicle 40 from the sitting surface 54 to the support surface 62. As illustrated, the slot 24 also includes a substantially rigid support 70. The support 70 allows the slot 24 to have an unrestricted passage for the coverstock 32 when the base cushion 22 is loaded to a limit. The limit is generally the upper weight range of a typical user, such as 300 pounds (136 kg). The support 70 is made of a polymer sheathing or similar material having the flexible and rigid characteristics necessary to support the slot 24 under the load limit.

In the embodiment generally illustrated in FIGS. 4A and 4B, the retention mechanism 102 uses a pullspring 106 as the principal means of applying tension to the coverstock 32 and drawing the coverstock 32 through the slot 24 when the movable cushion 26 moves to the rearward position 30 from the forward position 28. As part of the retention mechanism 102, a carrier track 116 is fixedly attached to the seatpan 12 and the carrier track 116 slidably engages a support slider 118. The distal end 104 of the coverstock 32 is coupled with the support slider 118 and the pullspring 106 is coupled between the support slider 118 and a bracket 112 positioned at an end of the carrier track 116. More specifically, when the movable cushion 26 is in the forward position 28, a first end 108 of the pullspring 106 is coupled with the support slider 118 and the pullspring 106 is stretched such that a second end 110 is coupled with the bracket 112 at an opposite end of the carrier track 116 from the support slider 118. When the movable cushion 26 moves to the rearward position 30, the pullspring 106 draws the support slider 118 rearward along the carrier track 116 toward the bracket 112, which in turn draws the second portion 36 of the coverstock 32 through the slot 24.

Similarly, as illustrated in FIGS. 5A and 5B, another embodiment of the retention mechanism 102 uses the carrier track 116 and the support slider 118 with the pullspring 106 connected therebetween as the principal means of applying tension to the coverstock 32. The slot 24 illustrated is substantially orthogonal to the top surface 80 of the movable cushion 26. Accordingly, in the forward position 28, the support slider 118, which is coupled with the distal end 104 of the coverstock 32, does not align the distal end 104 of the coverstock 32 with the slot 24, as provided in the embodiment illustrated in FIGS. 4A and 4B. When the movable cushion 26 transitions to the rearward position 30, the pullspring 106 draws the support slider 118 rearward on the carrier track 116 and in turn draws the second portion 36 of the coverstock 32 through the slot 24, while maintaining tension on the coverstock 32 spanning over the gap 38. In addition, when transitioning to the rearward position 30, the support slider 118 slides rearward from the opposite end of the carrier track 116 toward the bracket 112, thereby releasing some tension on the pullspring 106.

In the embodiment shown in FIGS. 6A and 6B, the retention mechanism 102 includes the pullspring 106, which is coupled at the first end 108 with the distal end 104 of the coverstock 32. The second end 110 of the pullspring 106 is coupled with the bracket 112 that is fixedly attached to the seatpan 12. A roller 114 is positioned below the slot 24 to guide the coverstock 32 in alignment with the slot 24 as the movable cushion 26 transitions between the forward and rearward positions 28, 30. When the movable cushion 26 moves to the forward position 28, the pullspring 106 is stretched to allow the second portion 36 of the coverstock 32 to feed into the slot 24. As a result of the pullspring 106 stretching, tension is provided to the coverstock 32. It is conceived that a series of pullsprings 106 could be attached along the distal end 104 of the coverstock 32 to provide a consistent tension along the width 60 (FIG. 2A) of the slot 24. When the movable cushion 26 moves to the rearward position 30, tension is released from the pullspring 106 as the coverstock 32 is drawn through the slot 24.

Referring again to the embodiment illustrated in FIGS. 6A and 6B, the second portion 36 of the coverstock 32 includes a series of thin, rigid support panels 94 extending along the width 60 (FIG. 2A) of the slot 24 to provide support when concealing the gap 38. The support panels 94 are integrated into the coverstock 32, providing characteristics similar to a tambour cover of a roll top desk.

In another embodiment of the vehicle seating assembly 10, as shown in FIGS. 7A and 7B, the retention mechanism 102 includes a rack and pinion apparatus 120. The apparatus 120 has a top rack 122 coupled to the movable cushion 26, a bottom rack 124 coupled to the coverstock 32, and a pinion gear 126 disposed between the top rack 122 and the bottom rack 124. Further, the bottom rack 124 travels in a groove 128 that is coupled with the seatpan 12. The pinion gear 126 is sized to mate with the top rack 122 and the bottom rack 124 and is horizontally stationary relative to the base cushion 22. Translation of the movable cushion 26 between the forward and rearward positions 28, 30 cause the top rack 122 to rotate the pinion gear 126 and thereby translate the bottom rack 124 in a corresponding rearward or forward direction. When the bottom rack 124 moves in the rearward direction, the second portion 36 of the coverstock 32 is withdrawn from the slot 24. The roller 114 is positioned below the slot 24 to guide the coverstock 32 in alignment with the slot 24 as the movable cushion 26 transitions between the forward and rearward positions 28, 30. It is conceived that a motor may drive the pinion gear 126 to facilitate the activation of the retention mechanism 102.

Figure 8A:
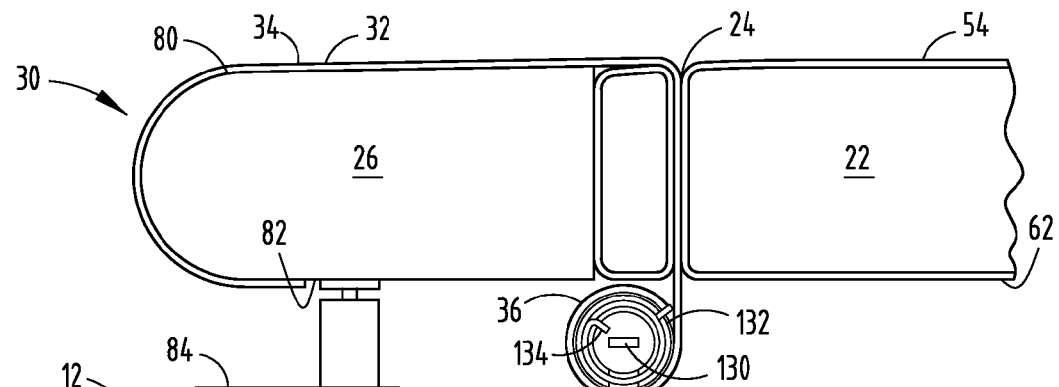
FIG. 8A is a side elevational cross-sectional view of another vehicle seating assembly having another embodiment of a retention mechanism and the movable cushion in a rearward position.
Figure 8B:
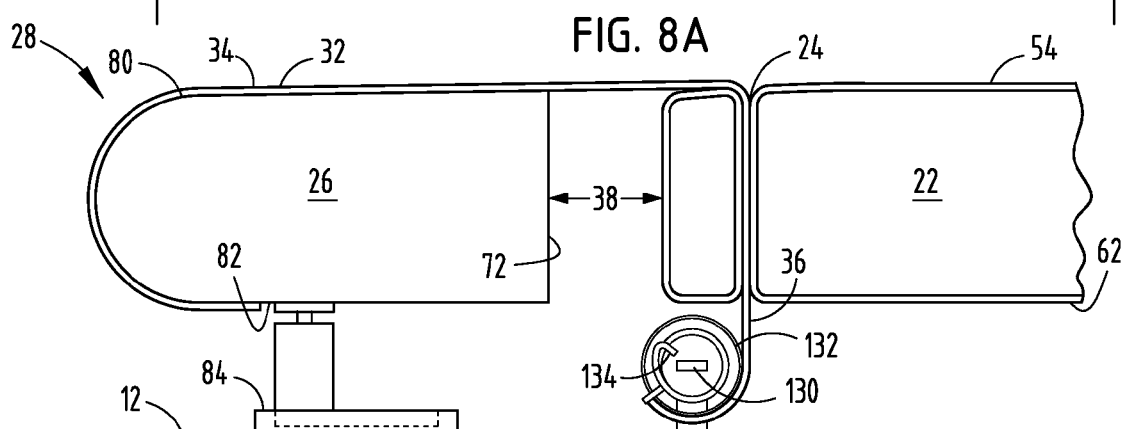
FIG. 8B is a side elevational cross-sectional view of the vehicle seating assembly of FIG. 5A with the movable cushion in a forward position.

In yet another embodiment of the vehicle seating assembly 10, as illustrated in FIGS. 8A and 8B, the retention mechanism 102 has a spring-loaded roller 130 that is coupled to the distal end 104 (FIG. 6A) of the coverstock 32. The spring-loaded roller 130 has a generally tubular shape and a dowel 132 that is spring-biased at each end with roller springs 134. The distal end 104 of the coverstock 32 is wrapped around and coupled with the dowel 132, and when the movable cushion 26 moves to the forward position 28, the dowel 132 rotates and unwinds the coverstock 32 from the dowel 132. The rotation of the dowel 132 winds the roller springs 134 and creates tension on the coverstock 32. The tension is released as the movable cushion 26 moves to the rearward position 30 and the coverstock 32 is drawn through the slot 24.

Figure 9A:
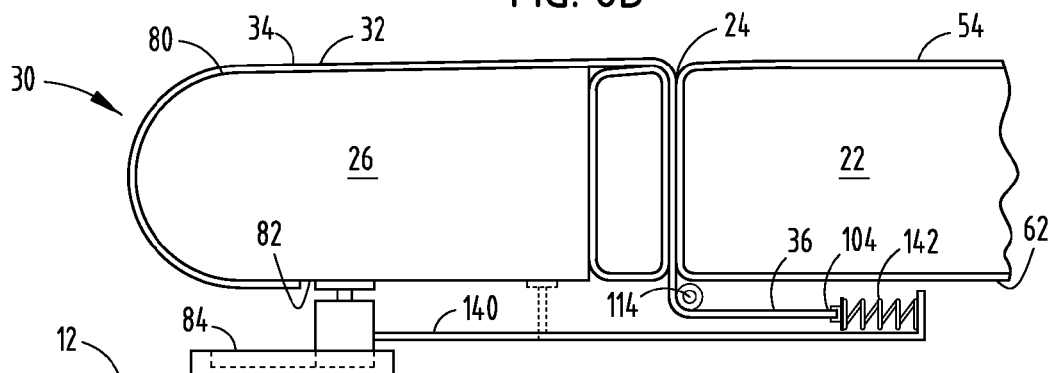
FIG. 9A is a side elevational cross-sectional view of another vehicle seating assembly having another embodiment of a retention mechanism and the movable cushion in a rearward position.
Figure 9B:
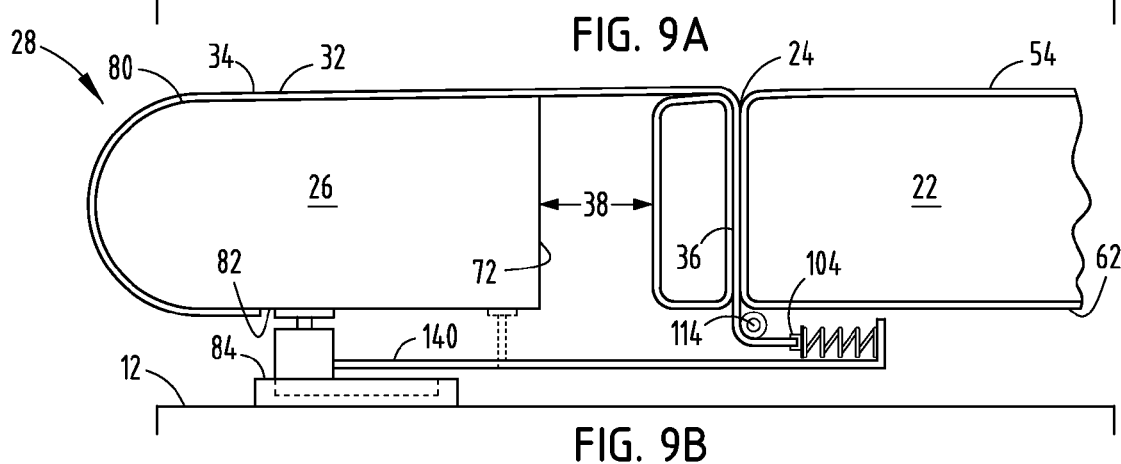
FIG. 9B is a side elevational cross-sectional view of the vehicle seating assembly of FIG. 9A with the movable cushion in a forward position.

Referring to FIGS. 9A and 9B, the vehicle seating assembly 10 has a retention mechanism 102 with a rigid shaft 140 that extends from the carriage assembly 84 to a location beyond the slot 24. As illustrated in dashed lines, it is also conceived that the rigid shaft 140 may alternatively extend from the movable cushion 26. A tension spring 142 couples the rigid shaft 140 to the distal end 104 of the coverstock 32. When the movable cushion 26 transitions from the forward position 28 to the rearward position 30, the rigid shaft 140 draws the coverstock 32 through the slot 24 at substantially the same rate that the movable cushion 26 moves relative to the seatpan 12. The roller 114 is positioned below the slot 24 to guide the coverstock 32 in alignment with the slot 24 as the movable cushion 26 transitions between the forward and rearward positions 28, 30. It is conceivable that a plurality of rigid shafts 140 could be attached along the distal end 104 of the coverstock 32 to provide a consistent tension along the width 60 (FIG. 2A) of the slot 24. It is also conceivable for a similar purpose that the rigid shaft 140 extends laterally to form a planar structure in substantial alignment with the bottom surface 82 of the movable cushion 26, or that a beam extends laterally between two rigid shafts positioned at edges of the distal end 104 of the coverstock 32.

One method of making the vehicle seating assembly 10, generally includes attaching the seatpan 12 to the track assembly 14 and attaching the track assembly 14 to the floor 42. The seatpan 12 has the base cushion 22 fixedly secured thereto. The slot 24 is horizontally formed on the front 52 of the base cushion 22. The slot 24 may be formed as an integral piece of the base cushion 22 or formed by cutting or stamping the slot 24 into the base cushion 22. Thereafter, the vertical support 70, such as a polymer sheath, may be inserted into the slot 24, providing vertical rigidity to the base cushion 22 around the slot 24. The movable cushion 26 is slidably coupled with the seatpan 12. The coverstock 32 is disposed over the movable cushion 26 and a portion of the coverstock 32 extends from the movable cushion 26 over the gap 38 between the movable cushion 26 and the base cushion 22 and is fed through the slot 24 in the base cushion 22. The coverstock 32 is then connected to the retention mechanism 102, generally between the support surface 62 of the base cushion 22 and the seatpan 12. Alternatively, the distal end 104 of the coverstock 32 is connected to the retention mechanism 102 and fed up through the slot 24 of the base cushion 22 and thereafter disposed over the movable cushion 26.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seating assembly, comprising:
   a seatpan;
   a cushion assembly having a one-piece base cushion with a slot defined between front and rear sections thereof and a movable cushion slidable on the seatpan between a rearward position abutting the front section and a forward position that defines a gap between the base and movable cushions; and
   a coverstock having a first portion disposed over the movable cushion and a second portion withdrawn through the slot when the movable cushion moves to the forward position concealing the gap.

2. The vehicle seating assembly of claim 1, wherein the coverstock includes a distal end coupled to a retention mechanism, and wherein the retention mechanism draws the second portion through the slot when the movable cushion moves to the rearward position.

3. The vehicle seating assembly of claim 2, wherein the retention mechanism includes a spring-loaded roller.

4. The vehicle seating assembly of claim 2, wherein the retention mechanism maintains tension on the second portion when the movable cushion moves to the forward position.

5. The vehicle seating assembly of claim 1, wherein the base cushion is fixedly coupled to the seatpan.

6. The vehicle seating assembly of claim 1, wherein the coverstock includes a bulbous edge that is retained in a channel defined in at least one side of a side cushion.

7. The vehicle seating assembly of claim 1, wherein the slot includes a substantially rigid vertical support and an unrestricted passage for the coverstock when the base cushion is loaded to a limit.

8. A vehicle seating assembly, comprising:
   a seatpan;
   a one piece base cushion on the seatpan with front and rear sections defining a slot extending vertically therebetween; a movable cushion moveable forward and rearward relative to the base cushion; and
   a coverstock having a first portion disposed over the movable cushion and a second portion withdrawn through the slot when the movable cushion moves forward, spanning over a gap between the base and moveable cushions.

9. The vehicle seating assembly of claim 8, wherein the coverstock includes a distal end coupled to a retention mechanism, and wherein the retention mechanism draws the second portion through the slot when the movable cushion moves to the rearward position.

10. The vehicle seating assembly of claim 9, wherein the retention mechanism maintains tension on the second portion when the movable cushion moves to the forward position.

11. The vehicle seating assembly of claim 9, wherein the retention mechanism includes a spring-loaded roller.

12. The vehicle seating assembly of claim 9, wherein the retention mechanism includes a rigid shaft extending in a rear direction from the movable cushion beyond the slot and coupled with the distal end.

13. The vehicle seating assembly of claim 9, wherein the retention mechanism includes a top rack coupled to the movable cushion, a bottom rack coupled to the coverstock, and a pinion gear rotatably coupled to the vehicle seating assembly and disposed between the top rack and the bottom rack, wherein rotation of the pinion gear translates the bottom rack in a rearward direction and withdraws the second portion of the coverstock.

14. The vehicle seating assembly of claim 8, wherein the second portion of the coverstock is spring-biased.

15. The vehicle seating assembly of claim 8, wherein the movable cushion abuts the base cushion when the movable cushion is in the rearward position.

16. The vehicle seating assembly of claim 8, further comprising:
   a gap defined by the area between the base cushion and the movable cushion in the forward position, wherein the gap is concealed, at least partially, by the coverstock.

17. The vehicle seating assembly of claim 8, wherein the coverstock includes a bulbous edge that is retained in a channel defined in at least one side of a side cushion.

18. The vehicle seating assembly of claim 8, wherein the slot includes a substantially rigid vertical support and an unrestricted passage for the coverstock when the base cushion is loaded to a limit.

19. A vehicle seating assembly, comprising:
   a seat base having a single piece with a slot defined between a front portion and a rear portion thereof;
   a seat extension movable between a rearward position and a forward position defining a gap between the front portion and the seat extension;
   a coverstock having a first portion disposed over the seat extension and a second portion released from an area below an upper surface of the seat base when the seat extension moves to the forward position, wherein the gap is concealed by the coverstock spanning generally in a plane of at least one of the upper surface and a top surface of the seat extension; and
   a retention mechanism coupled to the coverstock, wherein the retention mechanism draws the second portion downward when the seat extension moves to the rearward position.

20. The vehicle seating assembly of claim 19, wherein the retention mechanism includes a spring-loaded roller.

* * * * *